United States Patent [19]

Takahashi et al.

[11] Patent Number: 4,619,768

[45] Date of Patent: Oct. 28, 1986

[54] METHOD OF REMOVING CRUDE OIL SLUDGE

[75] Inventors: Sankichi Takahashi; Harumi Matsuzaki; Toshimi Mukushi, all of Hitachi; Katsuya Ebara, Mito; Tsunehiko Takakusagi, Hitachi; Masahiro Yoshida, Hitachi; Joshiro Sato, Hitachi; Yasumasa Yamane, Mito; Katsumi Sakaguchi, Hitachi; Akira Watanabe, Abiko, all of Japan

[73] Assignee: Hitachi, Ltd., Tokyo, Japan

[21] Appl. No.: 622,463

[22] Filed: Jun. 20, 1984

[30] Foreign Application Priority Data

Jun. 22, 1983 [JP] Japan ............................. 58-110810

[51] Int. Cl.⁴ ...................... B01D 17/12; B01D 21/02; B01D 21/26
[52] U.S. Cl. ........................ 210/739; 209/18; 209/211; 210/748; 210/777; 210/787; 210/803; 210/804; 210/805
[58] Field of Search .............. 209/144, 211, 18; 210/739, 748, 777, 778, 787, 788, 789, 790, 791, 793, 806, 103, 108, 143, 193, 252, 257.1, 259, 295, 319, 407, 408, 411, 512.1, 512.2, 515, 804; 427/244

[56] References Cited

U.S. PATENT DOCUMENTS

| | | | |
|---|---|---|---|
| 2,020,693 | 11/1935 | Manley et al. | 210/778 X |
| 3,907,686 | 9/1975 | Fletcher et al. | 210/411 X |
| 4,310,422 | 1/1982 | Romey et al. | 210/777 X |
| 4,473,117 | 9/1984 | Hill | 166/252 |

OTHER PUBLICATIONS

Perry, R. H., Chilton C. H.; Chemical Engineers' Handbook Fifth Edition 35-61 (1973).

Primary Examiner—Richard V. Fisher
Assistant Examiner—W. Gary Jones
Attorney, Agent, or Firm—Beall Law Offices

[57] ABSTRACT

The disclosure is related to a method for removing crude oil sludge, which is convenient for removing sludge while the crude oil is transported. The method for removing crude oil sludge from crude oil includes the steps of:

(a) classifying grains of sludge into coarse grains and small grains;
(b) settling the sludge in the crude oil discharged from the classification step to separate the coarse grains from the crude oil;
(c) sending the crude oil which is the supernatant constituent in the settling step to a filter in order to separate the remaining sludge in the crude oil; and
(d) introducing a part of the above crude oil to a reverse washing liquid inlet of the filter, in order to wash reversely the filter medium of the above filter.

6 Claims, 7 Drawing Figures

METHOD OF REMOVING CRUDE OIL SLUDGE

DETAILED DESCRIPTION OF THE INVENTION

1. Field of the Invention

This invention is related to a method and equipment for removing sludge (suspension solid substance) in crude oil, which can be performed in a short time, and especially to a method and equipment for removing crude oil sludge, which is applicable to removing sludge while the crude oil is transported and/or stored.

There are about 50 crude oil storage bases throughout the country (Japan) at present, and the number of crude oil storage tanks (which are hereafter referred to as tanks) amounts to 20-40 at each base. The average capacity of a tank is about 170,000 m$^3$ (80-100 m in diameter, 20-30 m in height). Crude oil is unloaded from a tanker in about ten hours. The necessary time for the transportation of crude oil from a tanker to a tank is significant, because the anchorage of a tanker which depends upon the unloading time becomes expensive.

The unloaded crude oil is kept still in a tank for several days. The sludge in crude oil is settled at the bottom of a tank in the meantime. Thereafter, the crude oil is transported to a refining process. Therefore, the usual tank is utilized as a sedimentation tank as well and there separates the sludge which obstructs the refining process of the crude oil. Therefore, in the usual crude oil transportation system (comprising tankers, tanks, refining process etc.), the removal of the sludge settled at the bottom of a tank and the cleaning is necessary at the time of the regular inspection (which is hereafter abbreviated as R.I.)

The legal R.I. is required to be executed once every 5 years. Therefore, the R.I. frequency at each base is about once for a month. So the cleaning of the above tank is done at the same ratio. Therefore, the necessary expense for these is a vast sum and amounts to even 1 billion yen at each base for the year.

The R.I. of a tank comprises the next 4 processes. (1) oil extraction. (2) removal of volatile constituents. (3) removal of sludge. (4) inspection and repair of corroded portions etc. in a tank.

Meanwhile, crude oil contains gravel, iron rust, heavy constituents like asphalt etc., gasoline, paraffin and salt water etc. In order to remove the volatile constituents in the process (2), even after the oil extraction was completed, the quick transference to the next process is impossible, because of the fear of explosion etc. Accordingly, it should take several months for the process (2).

The sludge settles to accumulate to the extent of at least about 25 cm thick at the bottom of a tank, and it is tightly congealed by nature due to paraffin constituent etc. in crude oil. In the process 3, workers enter a tank for cleaning and remove about 1,200 m$^3$ of sludge by human strength. It takes even several more months due to the bad condition of work surroundings.

The process 4 is the real inspection and repairing work. It takes about ten months for the R.I. of one tank.

Therefore, a simplified process and system for the above cleaning and inspection of a tank is strongly demanded, and some ideas have been tried, but at present there is not yet a more effective method, which can be performed in a short time. The sludge which once settled is tightly congealed by paraffin constituent etc. in crude oil as said above.

SUMMARY OF THE INVENTION

It is an object of this invention to solve the above problem of the transportation system of crude oil and to offer a method and system for removing crude oil sludge which can remarkably simplify cleaning and inspection of tanks.

The present invention is featured by the fact that part of the crude oil sludge in crude oil is removed by filtration before the crude oil enters a storage tank whereby settlement and accumulation of oil sludge in the storage tank are minimized. The present invention also features emptying, in combination with filtration, decantation and/or the overflowing of the settled sludge after suspending it in the crude oil.

A method of removing crude oil sludge of the present invention comprises the steps of supplying crude oil to a filtration apparatus having a filter medium with perforations of about 0.1-2 mm in diameter, subjecting the crude oil to filtration to separate sludge grains from the crude oil, and transferring the filtered crude oil to a reservoir.

In the above method of removing crude oil sludge a layer of the sludge grains can be formed as a filter aid on the surface of the filter medium.

The mean diameter of the sludge grains in the layer is preferably less than ten times as large as the minimum diameter of the sludge grains to be separated by filtration.

In the method of removing crude oil sludge the crude oil in the reservoir is stored for at least 3 days, before discharging it from the reservoir.

A method of removing crude oil sludge according to the present invention, wherein the crude oil is supplied to a liquid cyclone to separate coarse grains of sludge, prior to the filtration, when the crude oil is transported from a crude oil supply vessel to a reservoir.

In the method of removing crude oil sludge, the sludge is classified by the cyclone into a fine grain size, a small grain size and a coarse grain size, and the small grains having a diameter less than ten times the minimum diameter of the fine grains to be separated by filteration are coated on the filter medium.

The size of the sludge grains to be separated by the filtration is larger than 5 μm.

An equipment for removing crude oil sludge from crude oil of the invention comprises:

(a) means for classifying grains of sludge into coarse grains and small grains;

(b) means for settling the sludge in the crude oil discharged from the classification means to separate the coarse grains from the crude oil;

(c) means for sending the crude oil which is the supernatant constituent in the settling means to a filter means in order to separate the remaining sludge from the crude oil; and (d) means for introducing a part of the above crude oil to a reverse washing liquid inlet of the filter means, in order to wash reversely the filter medium of the above filter.

In the equipment for removing crude oil sludge the filter medium is coated with sludge separated from the crude oil by a liquid cyclone, said sludge having a grain size of ten times the smallest grains separable by filtration.

The sludge on the filter medium has such a diameter that the sludge grains settle within 7 days but do not settle within 3 days.

A system for removing crude oil sludge of the invention comprises:

(a) means for removing sludge, which comprises a series of liquid cyclones and filters and separates the sludge from crude oil by two steps;

(b) a sedimentation tank which settles the above sludge in crude oil containing the sludge of coarse grains, discharged by the classification of the sludge of coarse grains, discharged by the classification in the above liquid cyclone;

(c) the piping for sending the crude oil to the filter in order to separate a part or all of the remaining sludge in the crude oil, which is the supernatant constituent in the above sedimentation tank, by the above filter;

(d) the piping for introducing a part of the above crude oil to a reverse washing liquid inlet of the filter, in order to wash reversely the filter medium of the above filter utilizing the crude oil which was processed by the filter;

(e) a crude oil storage tank; and (f) the piping for connecting the above filter with the above storage tank in order to send the crude oil, which was processed by the above filter, to the above storage tank.

The system mentioned above has a crude oil tank which is provided with means for detecting sludge settled in the tank and with means for stirring the crude oil to disperse the the sludge therein.

The tank is further provided with means for controlling said detecting means and stirring means, whereby controlling both means is performed automatically.

The method of removing crude oil sludge of the invention further comprises, after the filtered crude oil is transferred to said reservoir and after a predetermined period of time, detecting the condition of crude oil sludge settled in said reservoir; dispersing said settled sludge by stirring the crude oil; and removing the crude oil containing the suspended sludge from the reservoir.

In the method of removing crude oil sludge, the detection of the condition of the crude oil sludge is performed by scanning at least the all surface of the bottom of the reservoir with a supersonic wave and by detecting information of a reflective supersonic wave.

DESCRIPTION OF THE INVENTION

Figure 1:
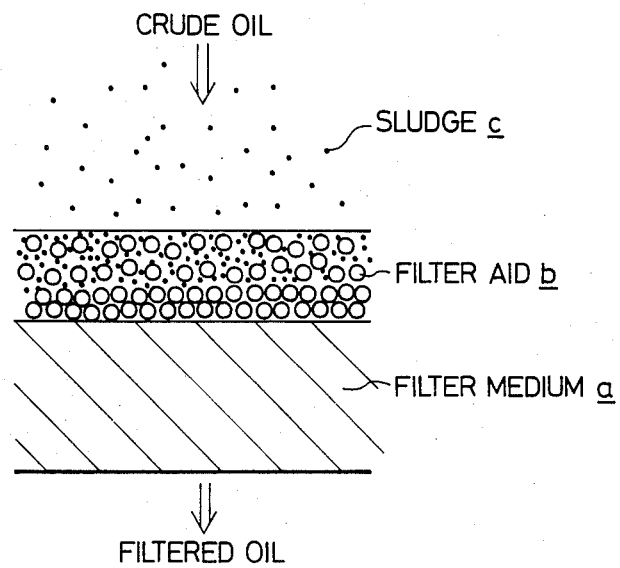
FIG. 1 is a sectional view of a filter medium showing the principle of the precoated filter.

The present inventors have found the following phenomena. That is, the sedimentation and accumulation of inorganic sludge takes place within 3 days in a storage tank, and then the further settlement of sludge is extremely slow, i.e. the minute sludges have a sedimentation velocity less than $7.7 \times 10^{-5}$ m/s which is almost negligible within usual storage time in a tank. The inventors studied the sedimentation phenomena of the sludge in crude oil. As a result, they have found that it is preferable to remove part of the sludge of comparatively coarse grain size with the sedimentation velocity greater than $7.7 \times 10^{-5}$ m/s before storing and filtration of the crude oil.

The method of removing crude oil sludge of this invention is featured by separating the sludge, which settles or precipitates within 3 days in a storage tank. The relationship between the diameter d of grain size and the specific gravity $\gamma$ of grains satisfies the following equation. Namely, the filtration of the sludge in crude oil is performed by means of a filter medium with holes or perforations of 0.05 mm or above in diameter.

$$\frac{d^2(\gamma - \gamma_L)}{18\mu} \geqq 7.7 \times 10^{-5} \qquad (I)$$

where $\gamma_L$ is specific gravity of fluid and $\mu$ is viscosity of liquid.

Grains in stationary liquid move by the driving force due to the difference in specific gravity between the grains and the liquid.

Consequently, when grains of different specific gravity precipitate, the gravity, which acts on grains, balances with a flow resisting force, due to settling grains so that the grains settle at terminal velocity. This terminal velocity u is represented by means of the equation (II).

$$u = \frac{d^2(\gamma - \gamma_L)}{18\mu} \qquad (II)$$

Here u, which is given from formula (II), is of the ideal state in stationary liquid, in relation to any d, while the diameter $d_c$ (which is hereafter called the critical settling grain diameter) of the grain, which practically does not settle because of the turbulent flow of liquid due to the thermal convection and vibration etc. of a tank wall etc. in an actual tank. This is the sludge grain diameter which does not settle in 3 days. Usually, a volume of settling sludge increases according to an increment of time, but the volume is saturated after a certain time Ts. The volume of settling sludge at Ts depends on $\mu$ (viscosity of crude oil) and $\gamma_L$, but Ts is independent of $\mu$ and $\gamma_L$ and is constant.

The values of the critical settling grain diameter can be given by formula (I) and vary according to various values of viscosity and specific gravity of crude oil. This invention is based on a discovery that the sludge larger than the critical settling grain diameter can be removed in the process of transportation of crude oil from crude oil supply tanks such as tankers etc. to reservoirs such as storage tanks etc.

The values of viscosity of crude oil are varied according to oil producing districts and range from 2.5 to 280 cSt. The values of the critical settling grain diameter generally range from 5 to 170 $\mu$m.

The filtration process is the technology for separation by which the sludge of a grain diameter larger than a certain boundary diameter can be removed. A filter medium is suitable if the medium can catch a larger sludge than a sludge of the boundary diameter in liquid.

A reverse washing is necessary for this technology, which is a process for regenerating a filter medium.

While repeating the filtering and reverse-washing, the sludge, which can not be removed from the filter medium by reverse-washing, may adhere to the filter medium and deteriorate filtration efficiency.

It is especially effective for the method of this invention to apply the filtration process by precoating. In the precoating filtration, a filter aid b having perforations of an adequate diameter is precoated on the surface of the filter medium a as shown FIG. 1; this filter aid b catches sludge c to remove it from the liquid. Therefore, the strain on the filter medium itself is low. The sludge and filter aid separated from the filter medium by the reverse-washing are separated from each other, and the filter aid can be reused. Consequently, the reverse washing can be performed completely and a long operation of the filter medium is possible. As the sludge is caught in the internal filtration, the increase of a pressure loss is less than in the case of the usual surface filtration. The separating operation of sludge from the filter aid is necessary, or the amount of sludge accumulated increases. In case of separation of the sludge and filter aid, the addition of a special coagulating agent and utilization of supersonic waves etc. are necessary. These processes are not suitable for crude oil because these may change the composition of crude oil and detonation. If the separated sludge is disposed by burning, the expense will increase in proportion to an amount of the sludge.

In this invention, a part of the separated and recovered sludge of an adequate diameter can be used as a source of the filter aid. In this case, the merit of conventional filtration can be adopted, and the separating of the separated sludge on the filter aid is unnecessary. In other words, the mixture of the sludge and filter aid can be disposed as it is.

The settling mechanism of the crude oil sludge was studied by the inventors with a microscope, a differential thermal analyzer and so on, the following conclusions were obtained.

(1) The settling sludge in the tank comprises a layer of a compacted waxy composition 1 comprising high pour point substances such as wax. There are dispersed salt water drops 3 protected by a soap layer 2 and inorganic sludges 4 such as Fe-compounds in the layer.

(2) Almost all of the waxy composition in the settling sludge can be fluidized by a steam treatment at about 60° C. and can be removed from the tank. But, the soap and salt water drops protected by the soap layer and inorganic sludges are residues in the tank. These residues in the tank are the residual sludge.

(3) The above 1 and 2 form or coagulate in the tank.

(4) The specific gravity of 4 is 3-5 times as large as that of 1, 2 and 3.

According to these results, it is preferable that the treatment of 4 should be carried out in the transportation from a tanker to a tank while the treatment of 1, 2 and 3 should be performed in the tank.

The treatment of 4 will be explained. Table 1 shows results of the fluorescence X-ray analysis of DT analysis residue using the residual sludge. Almost all inorganic sludges were Fe-compounds. Also, almost all sludges were compounds of heavy metal ions.

TABLE 1

| Composition (wt %) | | Composition (wt %) | | Composition (wt %) | |
|---|---|---|---|---|---|
| Fe | 45.8 | Na | 1.57 | Ni | 0.02 |
| Ca | 4.86 | K | 0.3 | V | <0.01 |

TABLE 1-continued

| Composition (wt %) | | Composition (wt %) | | Composition (wt %) | |
|---|---|---|---|---|---|
| Si | 3.18 | Cu | 0.08 | | |
| Zn | 3.1 | Pb | 0.06 | | |

DETAILED DESCRIPTION OF PREFERRED EMBODIMENTS

This invention is explained by way of figures as follows. The following experimental results were obtained from experiments conducted under the conditions shown below.

The detailed description of grain size of suspending sludge of crude oil is unknown at present. But, the larger part of sludge is gravel, while the smaller part is a corrosion product such as rust etc. The distribution is regarded as the normal distribution. The peak of distribution moves to the smaller size, because the larger grains settle more easily than the smaller ones and deposit on the bottom and the surface of wall of the tanker. Then, the amount of the sludge brought into the storage tank is substantially decreased before the landing of crude oil. Consequently, in the following experiment, a group of grains of calcium carbonate whose specific gravity is almost equal to that of $Fe(OH)_2$, the predominant corrosion product, was dispersed as a sludge sample in castor oil.

The properties of main imported crude oil vary with producing countries as shown in the following table.

TABLE 2

| Properties | Imported Crude Oil | Castor Oil |
|---|---|---|
| Viscosity | 2.5–34.7cSt(21–30° C.) | 4.75–10.3(20–30° C.) |
| Specific Gravity | 0.83–1 | 0.968 |

Figure 2:
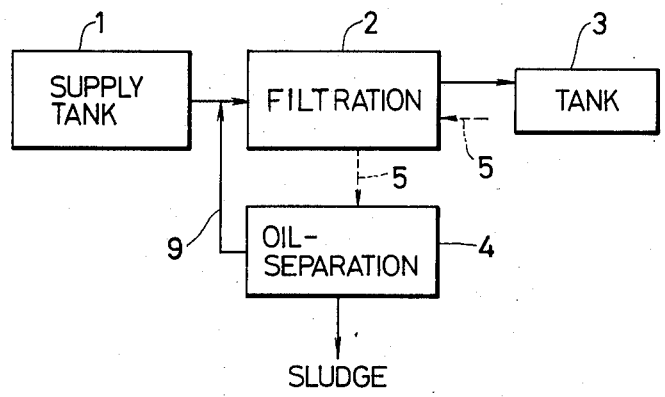
FIG. 2 and FIG. 3 are flow sheets of examples embodying this invention.

FIG. 2 is a flow sheet showing the method of removing crude oil sludge. Crude oil, which is sent from crude oil supply tank 1, is subjected to a separation step to separate sludge by filtration 2 and is stored in tank 3. It is convenient to regenerate a filter medium by timely reverse washing process 5. In this process, it is very effective for reverse washing to utilize the filtered crude oil. The sludge after reverse washing is processed the oil separation process 4, if necessary, and the oil 9 which was separated there is introduced into filtration step 2. Liquid for reverse washing is not necessarily the filtered crude oil.

Figure 3:
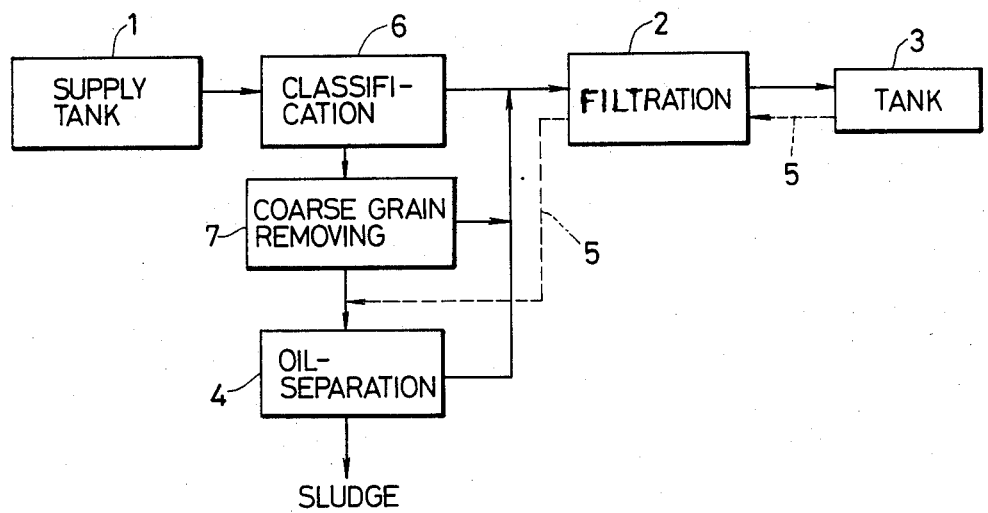
Figure 4:
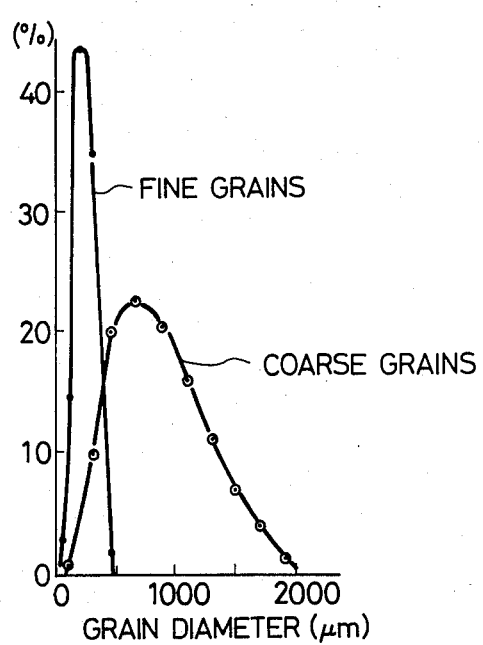
FIG. 4 shows data of classification properties of a liquid cyclone.

FIG. 3 is another flow sheet showing the method removing crude oil sludge. This system comprises crude oil supply tank 1, classifying process 6, filtration 2, coarse grain removing process 7, oil separation process 4 and reverse washing system 5. The sludge in crude oil is classified into coarse grains, small grains and fine grain. The fine grains have such a mean grain diameter that they do not settle within 3 days in a tank. The small grains have a mean grain diameter which is about ten times as large as the largest one among fine grains. The coarse grains have a mean grain diameter larger than that of small grains. FIG. 4 is a distribution of grain diameters ($\mu$m), which shows a distribution of small grains and of coarse grains of calcium carbonate. The classification was carried out by means of a liquid cyclone. The small grains and coarse grains have a kinetic viscosity of 0.007 kg·s/m$^2$ in the liquid.

Most sludge is floating in crude oil due to the vibration etc. of a tank itself, while it is transported on the sea by the crude oil supply tank 1 such as a tanker. Crude oil is sent to the classifying process 6, where the sludge in crude oil is classified into small grains and coarse grains. After filtration, the small grains are precoated on the surface of a filter medium as a filter aid. Smaller grains in a small grain size which can pass a filter medium is subjected to filtration and sent to tank 3 to be stored. On the other hand, the classified coarse grains are subjected to a separation step 7 to remove coarse grains therefrom, whereby sludge of coarse grains is separated from the crude oil containing the sludge whose mean grain diameter is less than that of smaller grains. The former is subjected to oil separating process 4 and the latter to filtration process 2, so that the sludge of a larger grain diameter than the critical settling grain diameter can be removed.

The inventors have conducted experiments of the filtration of Fe(OH)$_2$ which is a corrosion product by utilizing an ion exchange resin of about 300 μm as a filter aid. It has revealed that the grains whose diameter is about a tenth of that of the filter aid could be caught by the filter medium. Consequently, the mean grain diameter of the filter aid should be less than 10 times as large as the critical settling grain diameter, but it is preferable to utilize such a filter aid whose grain diameter is about 10 times as large as the critical settling grain diameter in order to make maximum the merit of the precoating filter.

However, it is the most advantageous for the reverse washing of the filter medium used in the filtration 2 to use the crude oil in a tank. The crude oil used for the reverse washing, the filter aid, and the caught sludge should then be sent to the oil separating process 4, if necessary, where oil is separated. The separated oil is sent to a tank through the filtration process 2 or directly to a tank.

Figure 5:
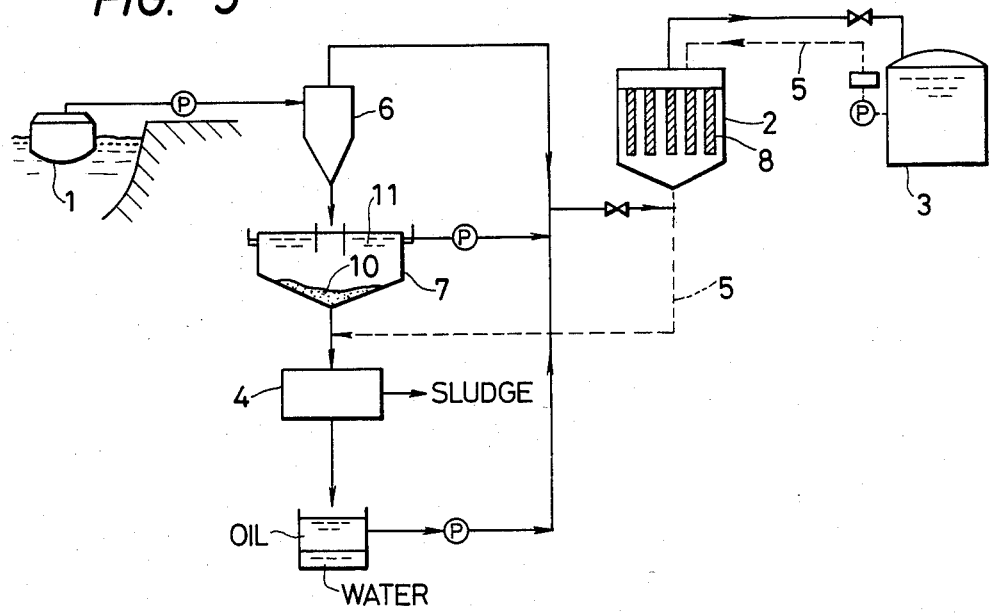
FIG. 5 is a system chart of crude oil storing equipment embodying this invention.

FIG. 5 shows the system of the crude oil sludge removing equipment as an example of this invention. This equipment comprises liquid cyclone 6, filter 2 with filter aid such as sludge grains which are self-supplied in the system, coarse grain removing equipment (sedimentation tank) 7, oil separator (decanter) 4, and reverse washing system 5.

Below is an explanation of a case where the kinetic viscosity of crude oil of 0.007 kg·s/m$^2$. The critical settling grain diameter is about 30 μm in this case.

In order to use sludge grains as a filter aid, the sludge whose mean grain diameter is 300 μm or less, is classified as a filter aid from the grains in crude oil by a liquid cyclone. As the classification characteristics of a liquid cyclone vary with viscosity of crude oil, a specific gravity, the pressure at the inlet, the distribution flow ratio and various sizes of equipment, the desired small grains can be separated by controlling these factors. However, the mean grain diameter of small grains in classification increases as the variation of the viscosity of crude oil. In this case, as the critical settling grain diameter increases as well, the alteration of the condition of classification is almost unnecessary or, if necessary, only a little alteration of an inlet pressure or a distribution flow ratio is required. The flow ratio which is derived from the classification characteristics shown in FIG. 4, is as follows: Small grain size: coarse grain size=9:1 (by weight).

Crude oil containing small grains is introduced from such as liquid cyclone 6 into the filter 2 precoated with a self-supplied filter aid, the filter aid being the small grains of sludge precoated on the surface of a filter medium. The diameter of perforations of the filter medium is, for example, less than about 0.3 mm. Crude oil containing the coarse grains, whose flow ratio decreased to 1/10, is introduced from liquid cyclone into sedimentation tank 7. The coarse grains settle here, and coarse grains 10 of sludge are taken out of the bottom of the sedimentation tank. On the other hand, the crude oil 11 containing the sludge smaller than the small grains is taken out of the top of the sedimentation tank by overflow, and introduced into the filter 2 with filter medium 8. In filter 2, the sludge grains larger than the fine grains are removed and separated from the crude oil which is introduced into a tank 3. The coarse grain sludge 10 taken out of the bottom of the sedimentation tank 7 is transferred to the decanter 4, and the crude oil is withdrawn from the sludge. The crude oil withdrawn here proceeds to the filter 2, or is transferred to a tank in accordance with the density of sludges.

Reverse washing of filter medium 8 is done when the pressure loss of the filter 2 reaches a certain value. In this system, the reverse washing is done by the reserved crude oil, and the crude oil used for the reverse washing is introduced into the decanter with small grains precoated with the filter aid and caught sludge, then they are separated between solid and liquid. In this invention, sludge can be continuously removed as through use of plural filters. In this way, filtration is done in some filters while the other filters are reverse washed and vice versa.

As above, an example of the transportation of crude oil from a tanker to a storage tank is shown in explanation of this invention. It is needless to say that the storage tank will do for a crude oil supply tank and the tanker or refining process will do for reservoir. And besides, the same storage tanks or the same tankers will do for the both crude oil supply tank and reservoir. The equipment of removing sludge of this invention may be installed on a tanker as well.

Next, the treatment of wax composition 1, soap layer 2 and salt water 3 will be explained. The inorganic and organic suspended solids in the crude oil are settled on the bottom of the tank in the form of sludge which is residual in the tank when the crude oil is taken out from the tank. The sludge is dispersed into the crude oil by periodic operations of mixers provided to the tank. While the mixers are operating, the solidification of the sludge is suppressed, but this effect is insufficient for the following reasons.

(1) A tank has the diameter of about 80-100 m.
(2) The position of the sludges in the tank can not be detected.

After the studies of the above mechanism of sludge formation and specialities of the above tank, it has been found that the position of almost all sludges in the tank could be detected by simply using a generator and receiver for sonar wave or microwave and that it was best to take the crude oil accompanied with these sludges out from the tank.

At present, the sonar wave or microwave has been utilized for the examinations or detections of (a) the bottom in the sea, lakes or rivers, (b) things laid under the ground, (c) dredging works, and so on. The sludge detection in the tank has the next three specialities in comparison with the conventional utilizations of sonar wave: (1) the sludges are dispersed on the metal plate, (2) a tank diameter is large as mentioned (1) above, and (3) the constituents and constitution of sludges are unknown.

The sonar utilizes vertical reflective wave in case of above (b) and random reflective wave in case of the fish detection. When the sonar wave impinges the even surface such as the metal plate surface, there is no random reflection. Therefore, the reflective wave from the metal surface can not be received by a sender and receiver except when an angle of reflection is vertical. On the other hand, when the sonar wave impinges the uneven surface such as sludge, the random reflective wave can be received by a sender and receiver irrespective of an angle of reflection. The metal plate of the tank bottom is equivalent to the above metal.

Therefore, by impinging the metal plate with the sonar wave at an angle of reflection and by receiving the reflective wave from the tank bottom, the existence of sludge in any points of the tank bottom can be determined. If no reflective wave is received, there is no sludge on the tank bottom. Also, the method of scanning or irradiating the metal plate surface with the sonar wave at an angle of reflection can solve the above speciality (b 2). All sludges on the tank bottom can be detected by a sender and receiver of a sonar wave, which is set on the center of the floating roof, with a sensor having a swinging neck.

Table 3 shows the results, which were obtained by studying the Arabian crude oil, as to the constituents and composition of the crude oil sludge. Here, it is important in considering the utilization of sonar wave that the settling sludge in the tank is the wax composition with the salt water drops uniformly protected by soap and inorganic sludges. It was found that the percentage of these salt water drops to the sludge weight of about 60% by weight.

The inherent sonic impedance, $Z_1$, of crude oil is $10.7 \times 7 \times 10^5$ Ns/m$^3$ at 34° C. and the inherent sonic impedance, $Z_2$, of wax is $11.6 \times 10^5$ Ns/m$^3$. Therefore, a sonic pressure reflective ratio, $\gamma = |(Z_1 - Z_2)/(Z_1 + Z_2)|$, between crude oil and wax is as small as 4%. On the other hand, the inherent sonic impedance $Z_3$ of salt water is $15.5 \times 10^5$ Ns/m$^3$. Thus, $\gamma$ between crude oil and salt water is as large as 18.3%.

Generally, the total sonic pressure reflective ratio increases and a reflective loss decrease, as a frequency of super sonic wave increases. Therefore, utilization of a high frequency super sonic wave is more preferable.

TABLE 3

| | composition | | |
|---|---|---|---|
| | wax and the like | salt water drops covered by soap | inorganic sludges |
| constitution | 30 wt % | 60 wt % | 10 wt % |
| | wax with salt water drops protected by soap and inorganic sludges | | |

Figure 6A:
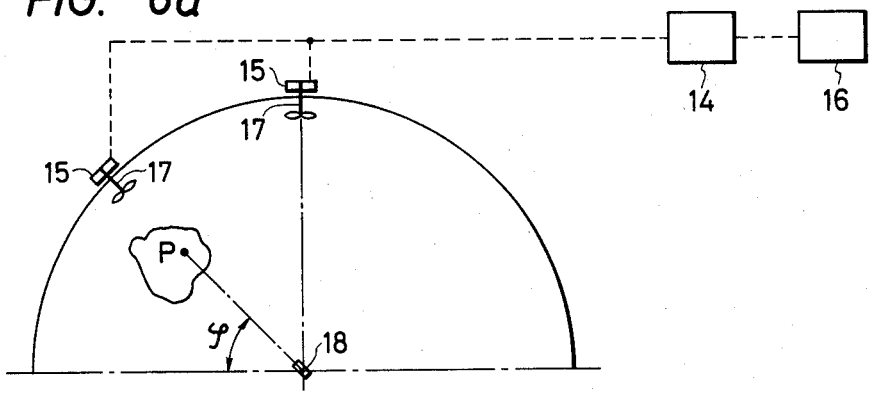
FIG. 6a is a plain view of a schematic structure of a crude oil tank embodying this invention and FIG. 6b is a vertical section view of a schematic structure of the crude oil tank.
Figure 6B:
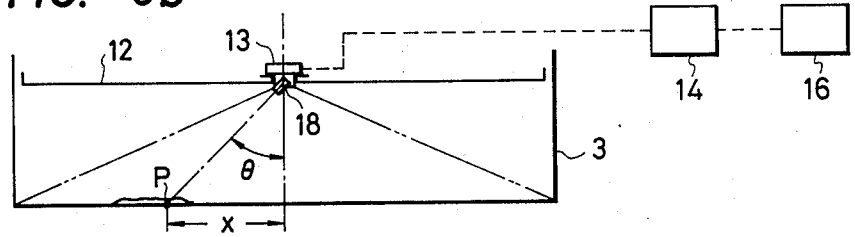

This invention is further explained by figures as follows. FIGS. 6a and 6b show the crude oil tank embodying this invention. This tank comprises a tank 3, a floating roof 12, a sender and receiver of sonar wave 13, control device 14 comprising a memory, calculation and control device (which is hereafter abbreviated as MCCD), mixers 15 and a display device 16. The sender and receiver 13 which has its sensor 18 placed in the crude oil is installed on the center of the floating roof 12. The sensor can swing in the directions of $\theta$ and $\phi$. By sending the super sonic wave in the direction of certain angles $\theta$ and $\phi$, the existence of reflective wave is detected by a sender and receiver 13. Reflective wave and reflective point $P(x,\phi)$ which is calculated by using the values of $\theta$, $\phi$ and depth are memorized by MCCD. For example, swing of the sensor in the direction of the circle begins at an angle $\theta$ of 10°, next at an angle $\theta$ of 15. The swing is carried out from 0° to 360°. The value of $\theta$ is increased from 10° to the reflective angle as shown by a two dots dashed line.

The sludge distribution in the tank can be displayed on a display device 16 in accordance with an output of all information. The mixers 15 have propeller shafts 17 which can swing in all directions. According to the above detection of sludge distribution, one or more of the mixers of which position is nearest to any sludges are selected and moving range of its propeller shafts are set by MCCD. Then, the sludge is dispersed into the crude oil by operating the mixers. It is desirable that all these operations are controlled and automated by MCCD. Of course, these operations can be carried out by manual operations, and two or more mixers can be operated at the same time.

Taking out of crude oil from the tank is started by comparison with the difference in the contrast between the sludge distributions before and after stirring.

It is possible by this invention to reduce the sludge volume in a tank and to simplify remarkably the operation of cleaning and inspection of a storage tank for crude oil. Moreover, it is possible to watch the conditions of the sludges in the tank all the time and to prevent the extraordinary settling of sludges therein.

What we claim is:

1. A method of removing crude oil sludge from crude oil, wherein the crude oil contains fine sludge grains, small sludge grains and coarse sludge grains comprising:

(a) supplying the crude oil to a sedimentation tank;
 (b) removing, after about three days, coarse grains which settle from the crude oil within about three days from the bottom of the tank and a crude oil supernatant from the top of the tank;
 (c) supplying the supernatant to a filtration apparatus to remove the small sludge grains;
 (d) transferring the filtered crude oil to a reservoir; and
 (e) after the filtered crude oil is transferred to said reservoir and after a predetermined period of time, detecting the condition of crude oil sludge settled in said reservoir, dispersing said settled sludge by stirring the crude oil, and removing the crude oil containing the suspended sludge from the reservoir, wherein the detection of the condition of the crude oil sludge is performed by scanning at least the surface of the bottom of the reservoir with one of a sonar wave and a microwave and by detecting information of a reflective wave.

2. A method of removing crude oil sludge according to claim 1, wherein the diameter of sludge grains to be separated by the filtration is larger than 5 µm.

3. A method according to claim 1 wherein the filtration apparatus comprises a filtration medium with perforations of about 0.1–2 mm, the surface of said medium being coated with a layer of sludge grains.

4. A method of removing crude oil sludge according to claim 3, wherein the sludge grain in the layer has a mean diameter less than ten times as large as the minimum diameter of one of the sludge grains to be separated by filtration.

5. A method according to claim 3, wherein the sludge coated on the filter medium has such a diameter that the sludge grains settle within 7 days but do not settle within 3 days.

6. A method according to claim 1 wherein the coarse grains have a sedimentation velocity greater than $7.7 \times 10^{-5}$ m/s and fine and small grains have a critical grain diameter d determined by the formula $$\frac{d^2(\gamma - \gamma_L)}{18\mu} \geqq 7.7 \times 10^{-5}$$

wherein $\gamma$ is the specific gravity of the grain, $\gamma_L$ is the specific gravity of the crude oil and $\mu$ is the viscosity of the crude oil.

* * * * *